US009652109B2

(12) United States Patent
Borzello et al.

(10) Patent No.: US 9,652,109 B2
(45) Date of Patent: May 16, 2017

(54) PREDICTIVE CONTEXTUAL TOOLBAR FOR PRODUCTIVITY APPLICATIONS

(71) Applicant: Microsoft Corporation, Redmond, WA (US)

(72) Inventors: Eric M. Borzello, Redmond, WA (US); Kathleen R. Kelly, Bellevue, WA (US); Charles Marcus Reid, III, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 13/738,992

(22) Filed: Jan. 11, 2013

(65) Prior Publication Data
US 2014/0201672 A1    Jul. 17, 2014

(51) Int. Cl.
G06F 3/0481 (2013.01)
G06F 3/0482 (2013.01)
G06F 3/0484 (2013.01)

(52) U.S. Cl.
CPC .......... G06F 3/0481 (2013.01); G06F 3/0482 (2013.01); G06F 3/04812 (2013.01); G06F 3/04842 (2013.01)

(58) Field of Classification Search
CPC ..................................................... G06F 3/0481
USPC .......................................... 715/779, 711, 708
See application file for complete search history.

(56) References Cited

U.S. PATENT DOCUMENTS 5,664,133 A * 9/1997 Malamud .............. G06F 3/0482
345/902
5,726,688 A 3/1998 Siefert et al.
6,133,915 A * 10/2000 Arcuri ................... G06F 3/0481
715/779
6,232,972 B1 * 5/2001 Arcuri ................... G06F 3/0482
715/815

(Continued)

FOREIGN PATENT DOCUMENTS

EP     0566228 A2    10/1993
EP     2138929 A2    12/2009

(Continued)

OTHER PUBLICATIONS

"Ribbons", Retrieved at <<http://msdn.microsoft.com/en-us/library/windows/desktop/cc872782.aspx#quickAccessToolbars>>, Retrieved Date: Oct. 23, 2012, pp. 36.

(Continued)

Primary Examiner — David Choi
(74) Attorney, Agent, or Firm — Talem IP Law, LLP

(57) ABSTRACT

A predictive contextual toolbar is presented that provides an identifiable region on which predicted commands can be surfaced. This user interface can be presented in cases where an indication of a request for a command (such as a formatting tool) is received, for example, while a user is interacting with a canvas of a productivity application. When conditions for surfacing a predictive command are met, the system can display an identifiable region on which predicted commands are surfaced according to context associated with the conditions for surfacing the predictive command. The identifiable region may be an extension of a mini toolbar. One or more dynamic predicted commands can be surfaced on the identifiable region to provide easily accessible, user specific, context related commands.

16 Claims, 8 Drawing Sheets

(56) References Cited

U.S. PATENT DOCUMENTS

| | | | |
|---|---|---|---|
| 6,278,450 B1 * | 8/2001 | Arcuri | G06F 3/0481 715/763 |
| 6,622,119 B1 * | 9/2003 | Ramaswamy | G06F 17/276 704/275 |
| 7,992,085 B2 * | 8/2011 | Wang-Aryattanwanich | G06F 9/4443 715/711 |
| 8,661,350 B2 * | 2/2014 | Kim | H04M 1/72561 715/738 |
| 2002/0175955 A1 | 11/2002 | Gourdol et al. | |
| 2003/0030666 A1 | 2/2003 | Najmi et al. | |
| 2003/0109996 A1 * | 6/2003 | Salant | G01R 13/0227 702/68 |
| 2004/0153973 A1 * | 8/2004 | Horwitz | G06F 11/1402 715/255 |
| 2004/0186775 A1 | 9/2004 | Margiloff et al. | |
| 2006/0036945 A1 * | 2/2006 | Radtke | G06F 9/4443 715/708 |
| 2006/0168541 A1 * | 7/2006 | Hill | G06F 17/30873 715/810 |
| 2007/0254707 A1 | 11/2007 | Griffin et al. | |
| 2008/0034081 A1 * | 2/2008 | Marshall | G08C 17/02 709/223 |
| 2010/0114916 A1 * | 5/2010 | Cooke | G06F 17/30873 707/752 |
| 2010/0205576 A1 * | 8/2010 | Majumder | G06F 17/5081 716/122 |
| 2010/0318576 A1 * | 12/2010 | Kim | G06Q 10/04 707/802 |
| 2011/0029891 A1 * | 2/2011 | Kim | H04M 1/72561 715/752 |
| 2012/0124515 A1 | 5/2012 | Li et al. | |
| 2012/0260216 A1 * | 10/2012 | Chen | G06F 9/4443 715/835 |
| 2013/0019173 A1 * | 1/2013 | Kotler | G06F 3/0482 715/711 |
| 2013/0019174 A1 * | 1/2013 | Gil | G06F 3/04812 715/711 |
| 2013/0067384 A1 * | 3/2013 | Bier | G06Q 10/10 715/779 |
| 2013/0110992 A1 * | 5/2013 | Ravindra | H04W 8/18 709/220 |
| 2014/0201672 A1 * | 7/2014 | Borzello | G06F 3/0482 715/779 |

FOREIGN PATENT DOCUMENTS

| | | |
|---|---|---|
| WO | 99/66395 A2 | 12/1999 |
| WO | 03/014978 A2 | 2/2003 |
| WO | 2007/143821 A1 | 12/2007 |

OTHER PUBLICATIONS

Lee, Shirley, "A Little More Than the Average User Knows About MS Office Toolbars", Retrieved at <<http://ezinearticles.com/?A-Little-More-Than-the-Average-User-Knows-About-MS-Office-Toolbars&id=2093783>>, Retrieved Date: Oct. 23, 2012, pp. 2.

"LLToolBarView", Retrieved at <<http://wiki/secondlife.com/wiki/LLToolBarView>>, Retrieved Date: Oct. 23, 2012, pp. 2.

"International Search Report & Written Opinion for PCT Application No. PCT/US2014/011173", Mailed Date: May 9, 2014, Filed Date: Jan. 11, 2014, 9 Pages.

* cited by examiner

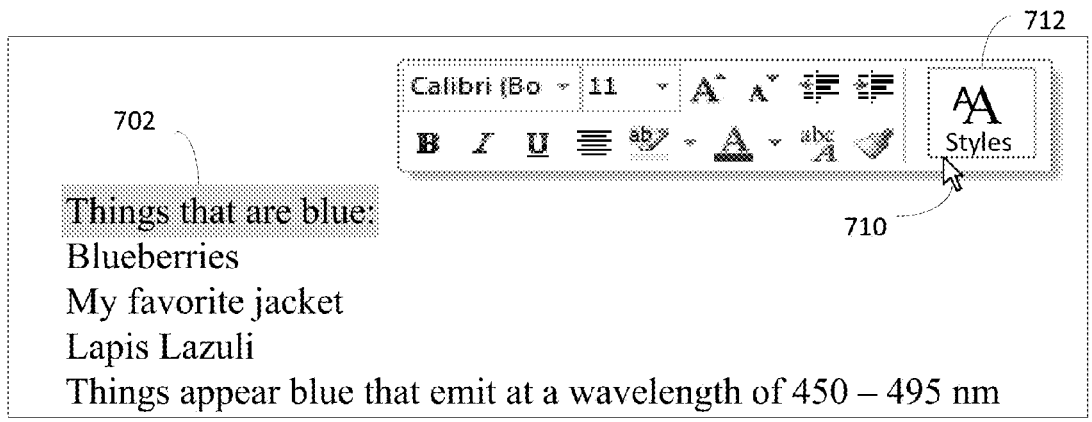
FIG. 7A
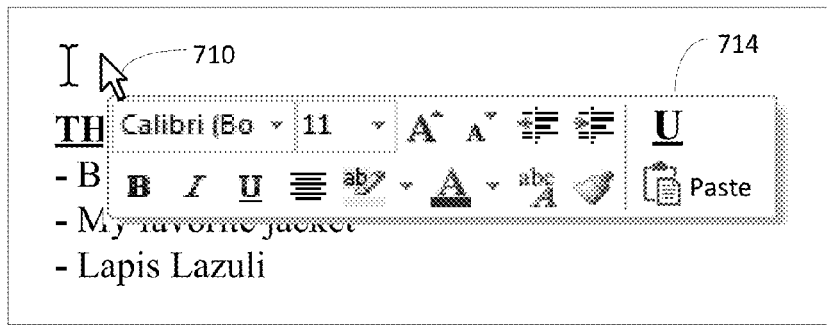
FIG. 7B
FIG. 7C

PREDICTIVE CONTEXTUAL TOOLBAR FOR PRODUCTIVITY APPLICATIONS

BACKGROUND

Productivity applications provide significant capabilities at a person's fingertips to create and modify content. As these programs expand to include more features and functions, the number of available commands that a user can perform increases. User interfaces for productivity applications generally include menus and toolbars that allow a user to access features and functions of the application in order to execute the commands. However, finding a feature a user needs to perform a certain task can be a challenge. It is not uncommon for a user to spend time searching for a command in various menus, which decreases productivity and increases frustration.

BRIEF SUMMARY

Identifiable regions and toolbars for the surfacing of predicted commands in productivity applications are provided. According to certain embodiments, the predictive nature of the commands being surfaced can be both user-specific and based on context. For example, instead of only presenting general commonly used commands in a toolbar, a region can be displayed that is clearly providing a selection of one or more anticipated or suggested commands that have been predicted and presented based on the user and/or the user's actions within the document.

According to one aspect, an identifiable region on which commands can be surfaced for a user to select for use while creating or modifying content is provided. The identifiable region can enhance a user's experience with a software application by presenting suggested or anticipated tool options for selection and use by the user.

According to another aspect, a designated region of an existing toolbar or menu is provided such that a user continues to have expected common commands available, as well as one or more suggested or anticipated commands.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 7A-7C illustrate a predictive contextual toolbar feature.

DETAILED DESCRIPTION

Figure 1:
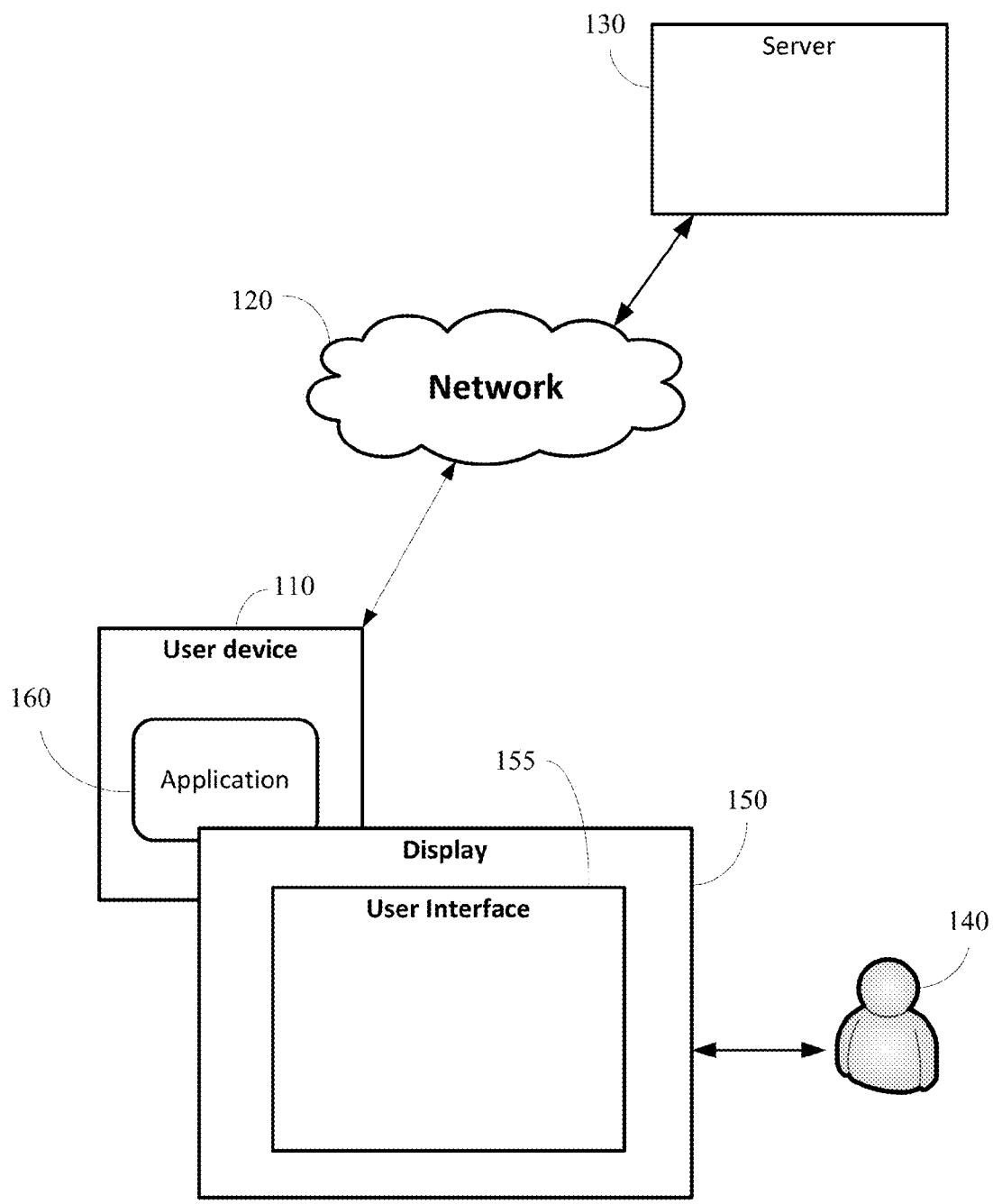
FIG. 1 shows an example operating environment in which various embodiments of the invention may be practiced.

According to some of the concepts and technologies described herein, a predictive contextual toolbar is presented that provides an identifiable region on which predicted commands can be surfaced. The identifiable region facilitates a user to easily access a likely next used feature or command within a productivity application.

The identifiable region for surfacing commands is "identifiable" by being a consistent location or presentation of the command(s) and may be located at any suitable position within a graphical user interface of a productivity application.

Productivity applications include authoring tools for creating and modifying documents, presentations, spreadsheets, databases, charts and graphs, images, video, audio, and the like. These applications can be in the form of a word processing software, spreadsheet software, personal information management (PIM) and email communication software, presentation programs, note taking/storytelling software, diagram and flowcharting software, and the like. Examples of productivity applications include the MICROSOFT OFFICE suite of applications from Microsoft Corp., such as MICROSOFT WORD, MICROSOFT EXCEL, MICROSOFT ONENOTE, all registered trademarks of Microsoft Corp.

Certain embodiments of the invention are directed to helping a user find the tools they need, when they need them. One part of this approach is to provide an identifiable region on which predicted commands can surface. The predictive commands can be dynamically generated commands the system believes a particular user needs. Although the user's history may be involved in predicting which commands the user may want to select, the predictive commands can be based not only on what the user has previously used, but also commands that the user might want to use in a particular context.

According to embodiments, the surfaced commands are not (actively) customized by the user.

The commands surfaced onto the identifiable region are dynamic. "Dynamic" commands refer to the predictive nature of the commands. Instead of simply presenting commands commonly used by most users in general or even customized to a specific user's general activity at the launch of the program, a predicted command (or multiple commands having a probability above a certain threshold) can be presented at any time throughout and during use of the program. The command(s) can be specific to the context and can change as needed based on a user's previous action (and commands).

The controls surfaced onto the identifiable region are context-related in that the surfaced commands change depending on the preceding actions taken by the user within the program as well as the particular content selected by the user for applying the formatting (or other command).

Any number of commands may be surfaced on the prediction portion. It is contemplated that 2-5 predicted commands be surfaced at a given time; however, embodiments may have more or fewer predicted commands surfaced. For example, one or two or three commands may be surfaced depending on context, two commands may always be surfaced, three commands may always be surfaced, three to five commands may be surfaced, more than five commands may be surfaced, or up to 10 commands may be surfaced.

In some embodiments, existing tool bars can continue to surface the common, general commands many users use. In one embodiment, the identifiable region on which predictive commands can be surfaced can be a designated portion of an existing toolbar or menu.

A "toolbar" refers to an element of a graphical user interface on which graphical representations of control elements are provided. The toolbar provides an interaction point for applying commands to manipulate data within an application. A toolbar can contain buttons, menus, or a combination of both. A menu displays a list of commands. Often a toolbar is distinguished from a "menu" by the primary use of buttons and its location; however, "toolbar" and "menu" may be used interchangeably in many scenarios.

Toolbars and menus provide the graphical user interface providing access to features and functions for many applications including productivity applications.

The portion of the tool bar where the common, general commands are presented can be referred to as the "static" part of the toolbar (the predictive region can be a "dynamic" part of the toolbar). It should be understood that the static part is not required to always provide the same menu items; rather, it is a portion of the graphical user interface that is not predictive. The static portion can be a portion of a tool bar that is designated by the system or created by the user. The static portion can also include a portion of the canvas.

A "canvas" refers to a portion of the screen on which content is created or consumed by the user.

FIG. 1 shows an example operating environment in which various embodiments of the invention may be practiced. Referring to FIG. 1, an example operating environment can include a user computing device 110 that may operate on or in communication with a network 120. The user computing device 110 may communicate with one or more servers 130 over the network 120.

The network 120 can be, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network 120 may include one or more connected networks (e.g., a multi-network environment) including public networks, such as the Internet, and/or private networks such as a secure enterprise private network. Access to the network 120 may be provided via one or more wired or wireless access networks as will be understood by those skilled in the art.

As will also be appreciated by those skilled in the art, communication networks can take several different forms and can use several different communication protocols. Certain embodiments of the invention can be practiced in distributed-computing environments where tasks are performed by remote-processing devices that are linked through a communications network. In a distributed-computing environment, program modules can be located in both local and remote computer-readable storage media.

The user computing device 110 can be, but is not limited to, a personal computer (e.g. desktop computer), laptop, personal digital assistant (PDA), video game device, mobile phone (or smart phone), tablet, slate, terminal, and the like. It should be apparent that the user computing device 110 may be any type of computer system that provides its user the ability to load and execute software programs and the ability to access a network, such as network 120.

A user computing device, e.g., the user computing device 110, is configured to receive input from a user 140, such as through a keyboard and/or mouse that is operably coupled to the first computing device 110. The user computing device 110 can further include a display 150 (e.g., a computer monitor), that is configured to display one or more user interfaces 155 to the user 140. In some embodiments, the display 150 can be a touchscreen such that the user computing device 110 may receive user input through the display.

The user interface (UI) 155 is used to interact with various applications, such as a productivity application 160, running on or displayed through the user computing device 110. One or more user interfaces of one or more types may be used to interact with content. For example, UI 155 may include the use of a context menu, a menu within a menu bar, a menu item selected from a ribbon user interface, a graphical menu, and the like. Menus may be in a traditional bar form or in a ribbon form or as a palette or other presentation of commands. Generally, UI 155 is configured such that a user may easily interact with functionality of an application. For example, a user may simply select an option within UI 155 to perform an operation such as formatting content being authored in an application 160.

The application 160 can be stored on the user computing device 110 (e.g., a client-side application). In another embodiment, the user 140 may access a web-based application (e.g., running on server 130) using a web browser (e.g., a standard internet browser), and the application's interface may be displayed to the user 140 within the internet browser. Thus, the application may be a client-side application and/or a non-client side (e.g., a web-based) application.

Figure 8:
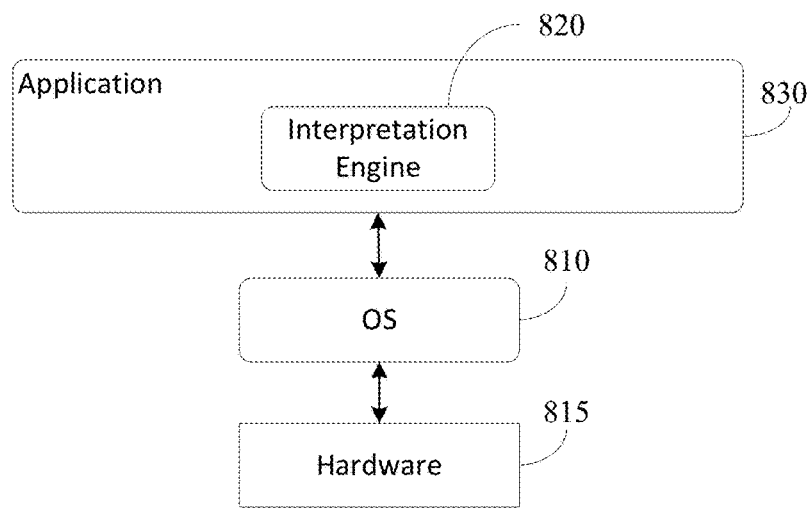
FIG. 8 shows an illustrative architecture for a user device on which embodiments of the invention may be implemented.
Figure 9:
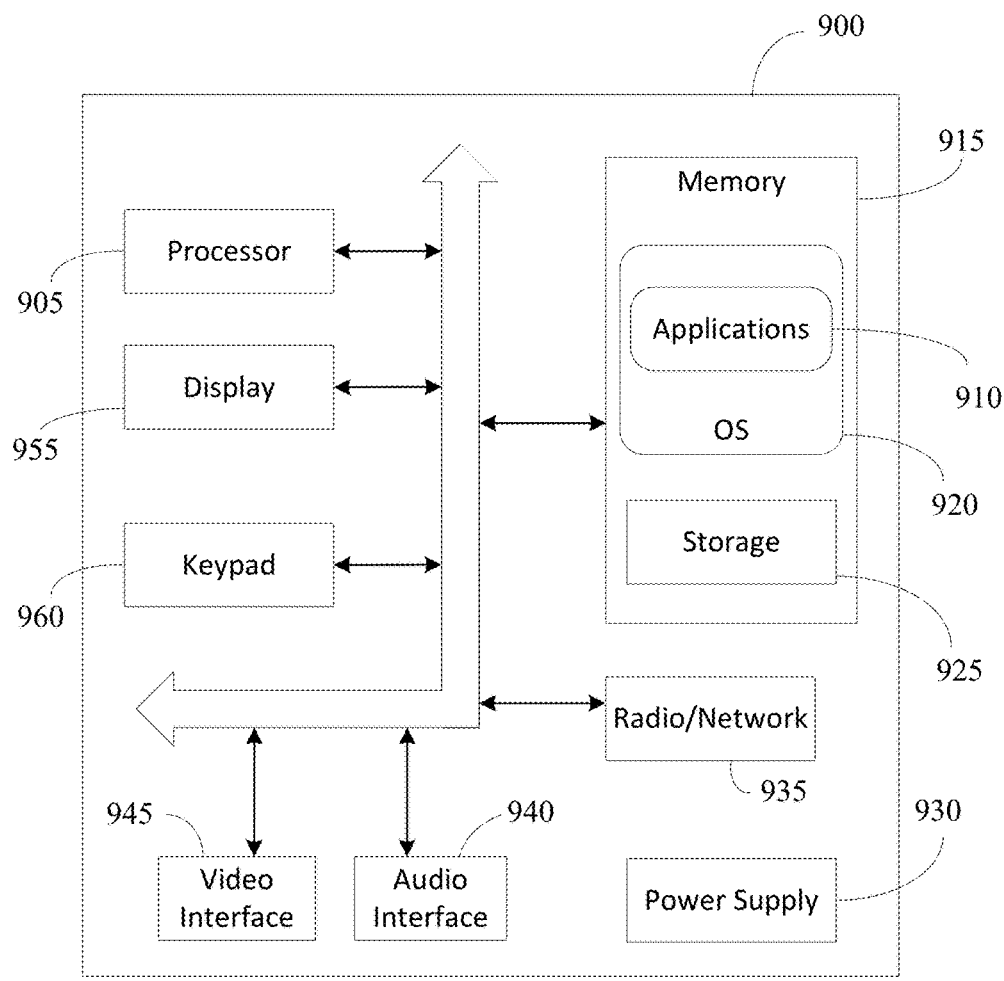
FIG. 9 shows a block diagram illustrating components of a computing device used in some embodiments.

An illustrative architecture for the user computing device 110 is provided with reference to FIGS. 8 and 9.

Referring to FIG. 8, the architecture for the user computing device 110 can include a device operating system (OS) 810. The device OS 810 manages user input functions, output functions, storage access functions, network communication functions, and other functions for the device. The device OS 810 may be directly associated with the physical resources of the device or running as part of a virtual machine backed by underlying physical resources. According to many implementations, the device OS 810 includes functionality for recognizing user gestures and other user input via the underlying hardware 815.

An interpretation engine 820 of an application 830 running on the device OS 810 listens (e.g., via interrupt, polling, and the like) for user input event messages from the device OS 810. The UI event messages can indicate a panning gesture, flicking gesture, dragging gesture, or other gesture on a touchscreen of the device, a tap on the touch screen, keystroke input, or other user input (e.g., voice commands, directional buttons, trackball input). The interpretation engine 820 translates the UI event messages into messages understandable by the application.

According to certain embodiments of the invention, a predictive contextual toolbar can be presented as part of an application's UI based upon a user's interaction with the UI.

Figure 2:
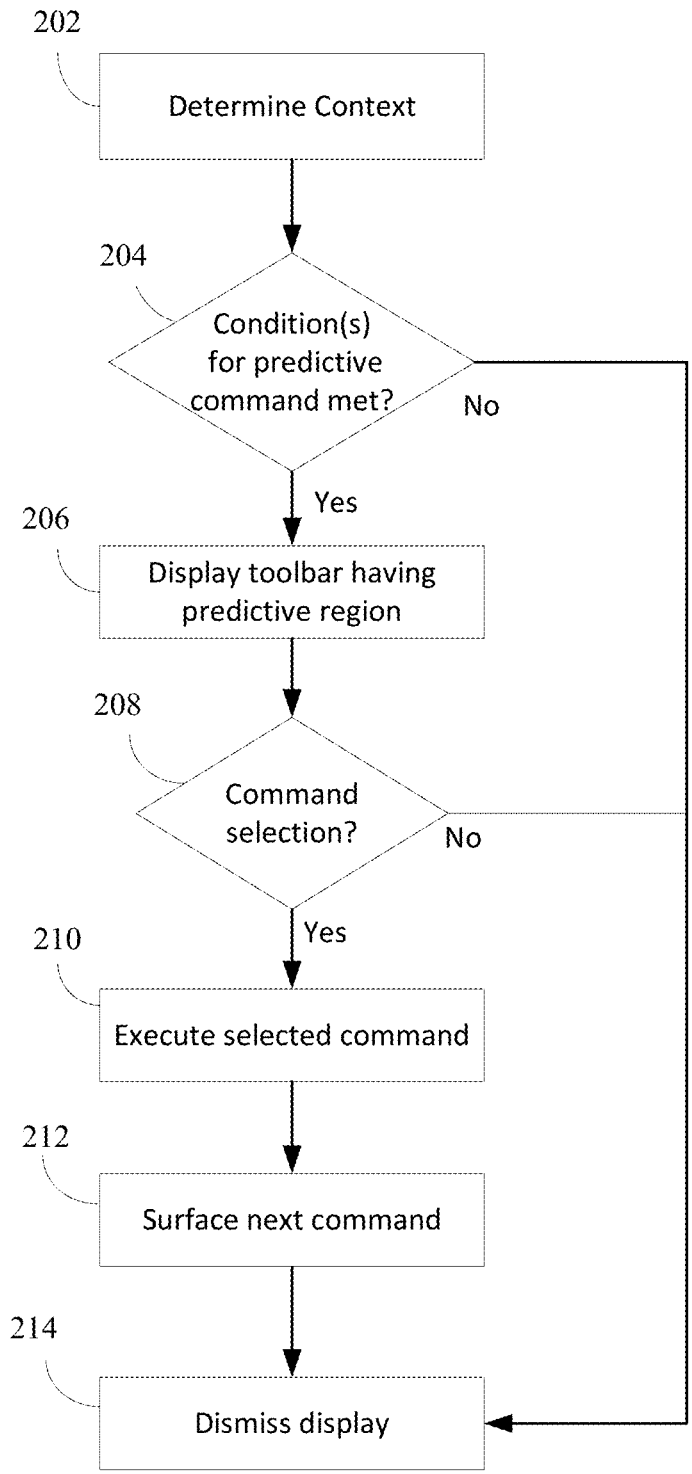
FIG. 2 shows an example process for utilizing a predictive contextual toolbar.

FIG. 2 shows an example process for utilizing a predictive contextual toolbar. Referring to FIG. 2, while an application is running, the method determines context (202). Context includes content, history, application type, application state, file, and the like, which create the user's environment and which indicates what types of tools or commands may be available for interacting with the environment. The determination of context (202) can be performed while a user interacts with a canvas presented by an application. Moving on to operation 204, the system determines if condition(s) for surfacing a predictive command are met. The conditions for surfacing a predictive command can be based on certain actions (or inactions) by a user, which indicate that an editing command may be desired.

The user's actions (or inactions) that may indicate that an editing command may be desired (and that can be conditions predicating the surfacing of a predictive command) include, but are not limited to, a manipulation to open a toolbar or menu, inactivity for a period of time, a series of interactions with a toolbar or menu that do not result in a selection of a command (e.g., when multiple tabs of a Ribbon-style toolbar are selected without executing a command), a selection of content, a right click from a mouse, a gesture (e.g., a touch, tapping, swipe, or the like), or voice input. The selection of content may be accomplished by interactions including, but not limited to, a mouse click, touch or tapping of a touch pad (or touch screen), hold and drag (via an input device), gestural selection, or other suitable user input mechanism.

If the application determines, at operation 204, that the conditions have been met for surfacing a predictive command, the method proceeds to operation 206, wherein predicted commands are surfaced onto an identifiable region, appearing as a toolbar.

The identifiable region may be a region designated for the predictive controls, for example, as an extension to an existing interface, such as a mini-toolbar, context menu or other palette or window.

One toolbar that an identifiable region (for surfacing the predicted commands) can be associated with is a mini toolbar. A mini toolbar refers to a toolbar that provides ease of access to formatting commands that people use most. The mini toolbar can include buttons for selecting a tool that may take various forms including, but not limited to, text, graphic, icon, video, picture, symbol, some combination thereof, and the like. It is contemplated that the mini toolbar and/or the identifiable region, may include an audio component, such as an audio alert. The tools available on the mini toolbar can include commands for text, fonts, and appearance. These commands can include alignment, text color, indenting, bullets, and font size. The mini toolbar is generally automatically displayed when a user selects content or right-clicks over content in a canvas.

The mini toolbar (and/or context menu and/or region menu) having the extension providing the identifiable region for predicted commands can be shown in proximity to the last (or current) location of user interaction on the canvas. The location of user interaction can be indicated, for example, as a selection of content or location of a cursor.

A "cursor" can be a movable indicator or icon that is displayed on a screen. The indicator may move as a result of input by a user through an input device (e.g., mouse, keyboard, touchpad or trackpad). The user can interact with the input device to generate inputs to a graphical user interface indicated by the placement of the cursor. In some embodiments, the cursor is not displayed. Rather, the cursor can be the location at which a user is touching a screen. In such embodiments, the "cursor" moves as the user's finger or stylus (or other object being used to touch a screen) moves and becomes located at a final position touched by the user even where no indicator is displayed.

In some cases, the mini toolbar having the extension starts out as transparent or semitransparent, but solidifies as the user hovers over the toolbar. For example, when text is selected, the mini toolbar may begin to appear, but will not solidify until the user rests a pointer on the mini toolbar. In some cases, the mini toolbar will appear to begin to solidify, but disappear again should the user not hover over (or rest on) the mini toolbar. This phenomenon can be referred to as being "shy" and easy to dismiss.

A mini toolbar help users more quickly access commands available within an application by displaying in-canvas close to a selected object in the graphics window and is designed to reduce the amount of distance a user's mouse or hand travels around a screen by facilitating formatting of content while being located on or near the content being formatted. Less distance for a mouse to move can mean less stress on a user from repetitive use injuries (e.g., carpel tunnel). By being provided as an extension to the mini toolbar, the identifiable region retains the benefits of the mini toolbar for the user and provides further benefits.

In some embodiments, the identifiable region (with or without the mini toolbar) is considered to be in proximity to a selected region of a canvas (or cursor location) if the identifiable region (and/or mini toolbar from which the identifiable region extends) is positioned within a specified distance of at least one selected content or region. This distance may be in millimeters, centimeters, inches, pixels, or some other unit of distance. In some embodiments, the identifiable region (and/or mini toolbar from which the identifiable region extends) is considered to be in proximity to a selected content if identifiable region (and/or mini toolbar from which the identifiable region extends) at least partially intersects a portion of the selected content or region. The selected content can include multiple media types, including text, images, and audio.

Figure 5A:
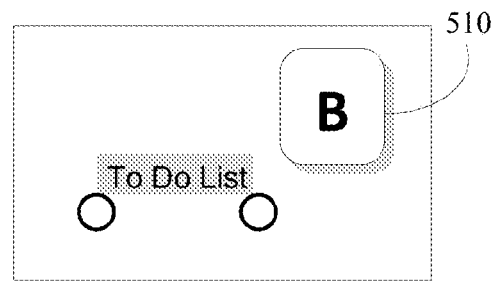
FIGS. 5A-5D show example identifiable predictive command regions.
Figure 5B:
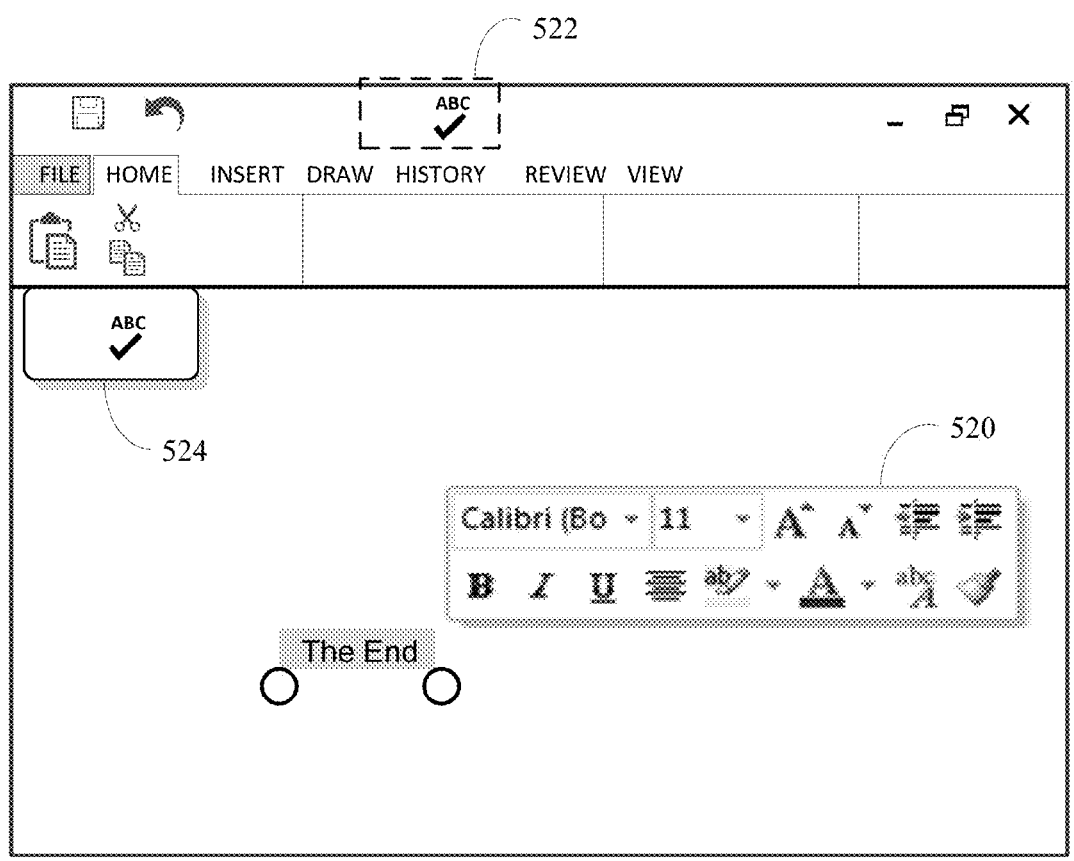

In some embodiments, such as shown in FIG. 5B the identifiable region is shown elsewhere within the application so as to be visible to the user but is not considered to be in proximity to a selected content or region.

Figure 4:
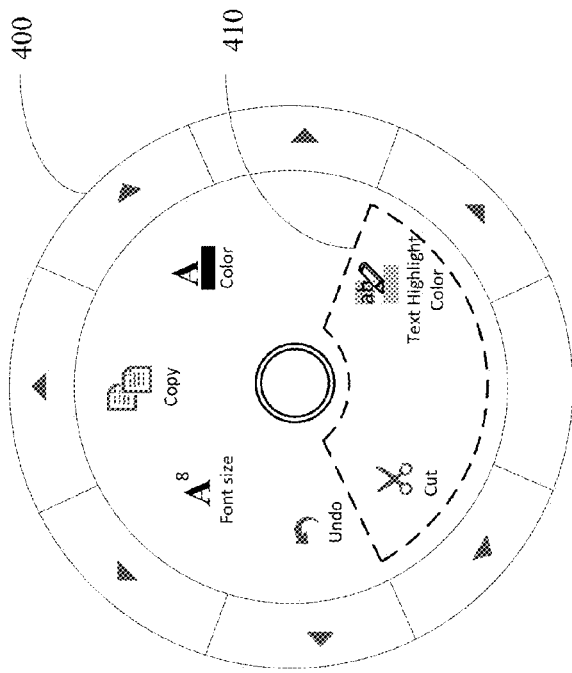
FIG. 4 shows an example palette toolbar having an identifiable predictive command region.
Figure 3C:
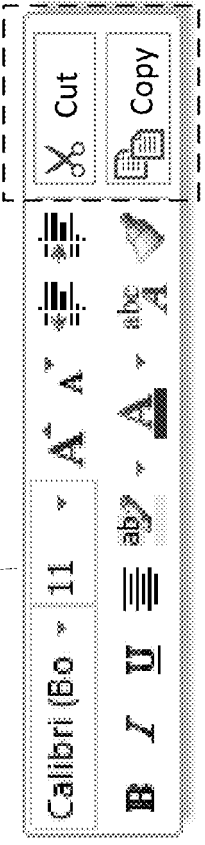
FIGS. 3A-3C show examples of mini toolbars having an identifiable predictive command region.
Figure 3A:
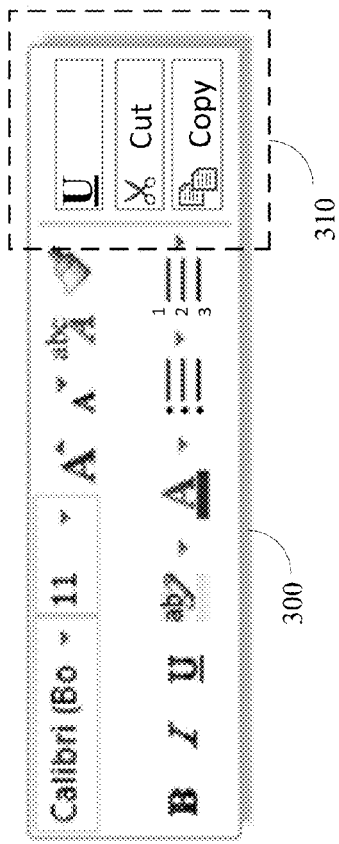
Figure 3B:
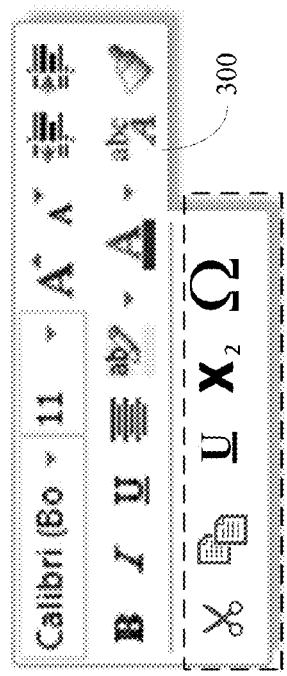

Examples of a mini-toolbar with extensions providing the identifiable region for predicted commands are shown in FIGS. 3A-3C. As shown in FIGS. 3A-3C, a mini toolbar 300 can include an extended region 310 on which one or more predicted commands can be surfaced. An example of a palette 400 with a designated region (shown within dotted lines) for providing the identifiable region 410 is shown in FIG. 4.

Although the predictive region is shown as being an extension of a floating toolbar (e.g., a mini-toolbar), the predictive region can be displayed at any suitable location that may be identifiable as being the region that surfaces the user-specific, context-related predicted commands. In one embodiment, the predicted commands can be surfaced on a region of the canvas separate from a set context menu or toolbar. For example, the predictive region can be located near a quick access toolbar, near a ribbon menu, near a task pane, at an edge region of a canvas, or at a stand-alone region such as shown in FIGS. 5A-5D.

Referring to FIG. 5A, the identifiable region 510 can be displayed without a static toolbar portion. In addition to being available upon command, the identifiable region 510 can be located at the user's fingertips—that is near the location of the content being affected by the command as the user interacts with the canvas.

Referring to FIG. 5B, a mini toolbar 520 can be displayed, and, at a same time, the identifiable region can be displayed and/or predicted commands surfaced on the identifiable region. For example, when the identifiable region 522 is located on a menubar, the command may surface at the same time as the mini toolbar 520 is displayed. Various prominence rules may be associated with the surfacing of the command in order to draw a user's attention to the area. In another embodiment, the identifiable region 524 can be a floating region located at any suitable area on the canvas. This identifiable region 524 can be displayed (e.g., 206 of FIG. 2) when the conditions for surfacing a predictive command are met.

Figure 5C:
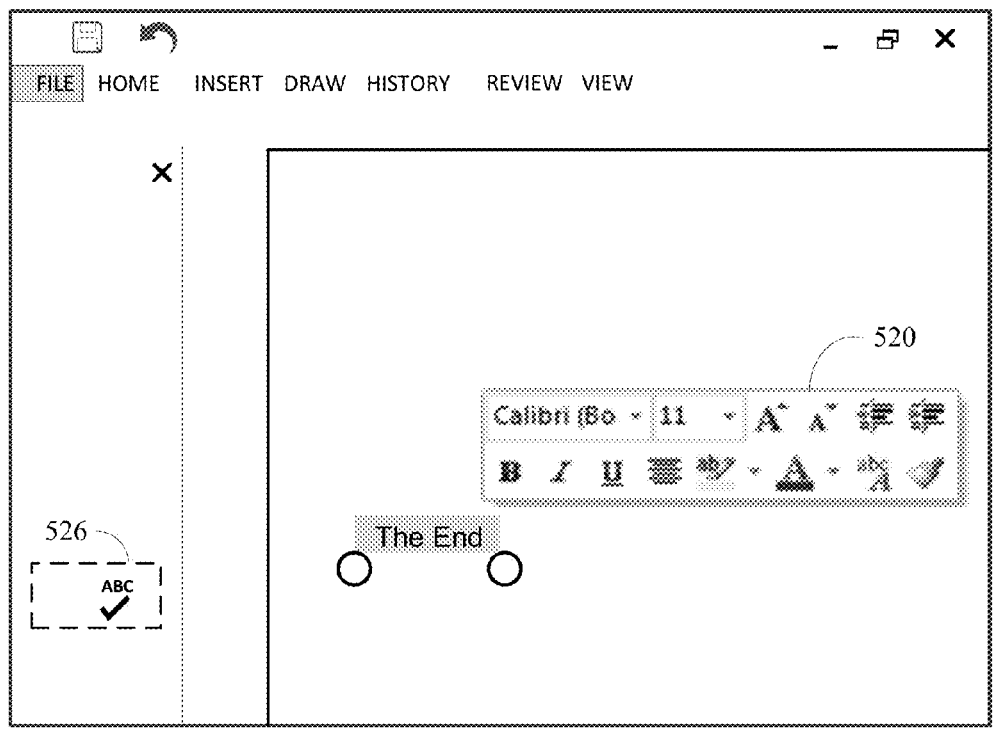
Figure 5D:
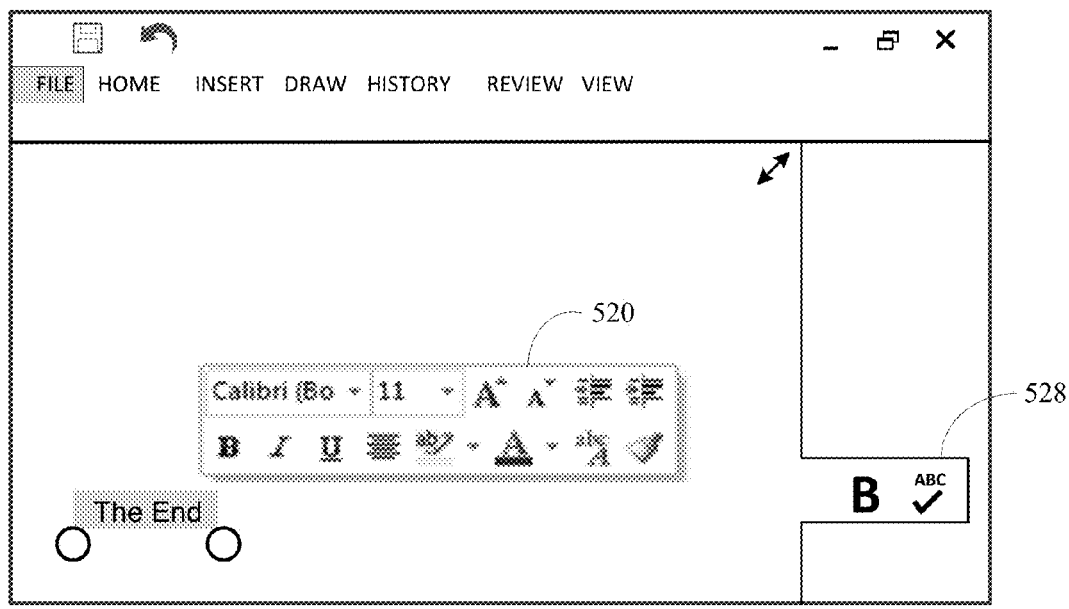

Referring to FIGS. 5C and 5D, a mini toolbar 520 can be displayed, and, at a same time, predicted commands can surface on an identifiable region (526, 528) of a side bar or task pane.

In some embodiments, one or more prominence rules are applied to define how prominently the mini toolbar and identifiable region is shown. In some embodiments, a prominence rule instructs the application to show the toolbar/region with a static button or menu. In some embodiments, a prominence rule instructs the application to change the opacity of the mini toolbar with identifiable region (or identifiable region alone) in relationship to mouse or other input (e.g., touch) proximity to that button. For example, when a cursor controlled by a mouse or other input device is within a specified distance from the mini toolbar (or displayed identifiable region), the toolbar may be presented as being 100% opaque, but as the cursor moves away from the toolbar, it becomes translucent, and at some point vanishes from view.

In some embodiments, a prominence rule instructs the application to show the mini toolbar and/or identifiable region on mouse over, when touched via a touchscreen interface, or when otherwise interacted with by a user through voice or some other user input. In some embodiments, a prominence rule instructs the application to show the tool bar for a predetermined time period, the expiration of which causes the tool bar to disappear, or to be reconfigured to, for example, appear on mouse over or via some other user input.

In some embodiments, a prominence rule instructs the application to show the mini toolbar with identifiable region (or identifiable region alone) with emphasis to draw a user's attention to the identifiable region. In embodiments in which the identifiable region includes text, illustrative emphasis types include, but are not limited to, font type, font size, boldface, italics, underline, overline, capitalization, letter spacing, punctuation, color, combinations thereof, and the like. In embodiments in which the identifiable region includes at least one graphic, icon, picture, or symbol, illustrative emphasis types include, but are not limited to, size, color, contrast, brightness, gray scale, special effects, animations, combinations thereof, and the like. In embodiments in which the identifiable region includes a video, illustrative emphasis types include, but are not limited to, auto-play, auto-enlarge, auto-fullscreen, and the like. Other emphasis types are contemplated.

Returning to FIG. 2, moving on to operation 208, the system determines if a command selection from the displayed toolbar is selected. If the application determines, at operation 208, that a command has been selected, the method proceeds to operation 210, wherein the selected command is executed, and to operation 212, wherein a next predicted command is surfaced onto the identifiable region. Operations 210 and 212 may be performed, or appear to be performed, atomically.

Transitioning to operation 214, the toolbar or menu (providing the identifiable region surfacing the predicted commands) is dismissed. For example, the user can dismiss the menu by clicking on (or touching) an area of the screen surface away from the menu. The display may be dismissed upon selection of a command or will remain present until the user performs an action outside of the toolbar. The display may also be dismissed in cases where the conditions for surfacing a predictive command are not met or where there is no movement to hover over the toolbar to make the toolbar opaque. Other dismissal interactions are also contemplated.

According to various embodiments, the predictive region surfaces commands based on a class of issues where predictions can be useful. Predictive commands can be surfaced upon receipt of (or in response to) an indication by the user that a command is desired. These indications can include, but are not limited to, an indication that the user is looking for a tool such as by right clicking, tapping, highlighting, or indicating some selection of content; an indication that the user is stuck or having trouble such as by a period of inactivity or repeatedly searching through ribbon tabs, menus, or other toolbars. In embodiments where inactivity is used as a condition for surfacing a predictive command, the inactivity can be based on seconds, minutes, hours, or other intervals of time.

Figure 6:
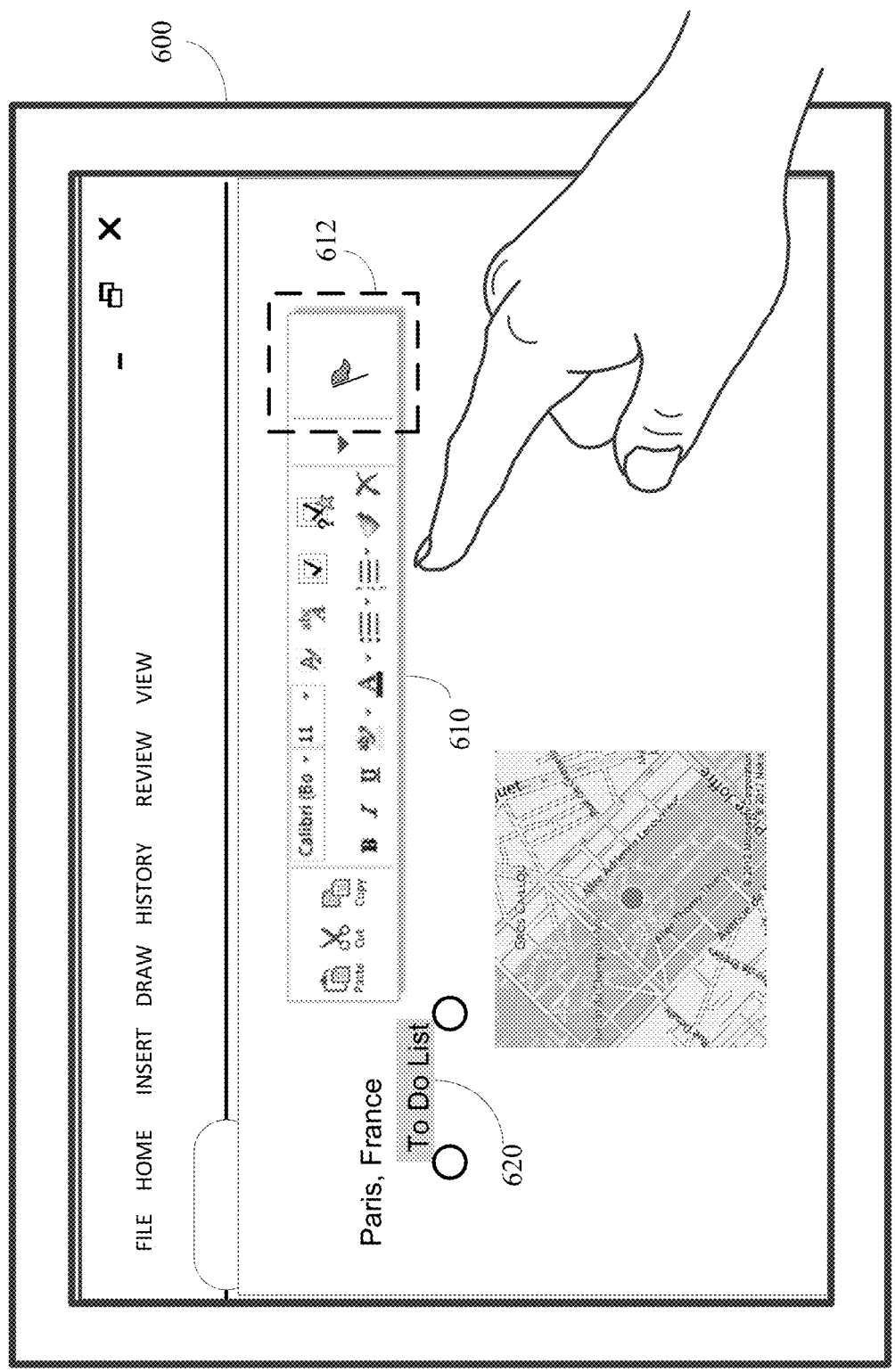
FIG. 6 shows an illustrative tablet device with a touch-enabled predictive contextual toolbar user interface according to an embodiment of the invention.

FIG. 6 shows an illustrative tablet device 600 with a touch-enabled predictive contextual toolbar user interface according to an embodiment of the invention.

In a touch mode of a mixed touch and pointer device system or for pure touch devices, the user interface is made bigger in order to accommodate using a finger to select a command from the toolbar. In order to preserve canvas space, some of the commands may disappear, and there may be something that a user may want that is different than what is available. In some cases, user customization is available. However, some users may not be aware of all the available features or functions and some non-advanced users may not have experience with adjusting tools available on a toolbar or menu. By surfacing predicted commands in an identifiable region that displays under certain conditions, canvas space can be preserved and the most likely needed tools presented to the user.

Referring to FIG. 6 in the illustrated embodiment, the touch-enabled predictive contextual toolbar user interface with mini toolbar 610 and identifiable region 612 is triggered by a selection of content 620 via a single or multi-touch gesture. The functionality of the touch-enabled predictive contextual toolbar user interface may be similar to the functionality for a mouse or other user input interface.

For touch-enabled user interfaces, by using a region on the mini toolbar, the predicted commands are right at a user's fingertips. Whereas, for mouse or other input device style user interfaces, by using a region on a mini-toolbar, less mouse movement is needed to reach frequently used functionalities.

Although the example toolbars illustrated in the figures are shown with formatting options, embodiments are not limited to such controls.

FIGS. 7A-7C illustrate a predictive contextual toolbar feature. In particular, an example usage flow is shown in FIGS. 7A-7C. For the example, a user is creating a journal entry based on the color blue for an assignment. A case is reflected where this user often prepares journal entries with similar behaviors including: typing text reflecting her thoughts—some in list form; making a header; formatting sections of text with bullet points; and inserting images (for example from pictures or video).

Referring to FIG. 7A, it can be seen that the user typed, in free-style, topics related to the color blue. What may be a list of "Things that are blue:" is displayed along with "Blueberries," "My favorite jacket," and "Lapis Lazuli,"

followed by a statement that "Things appear blue that emit at a wavelength of 450-495 nm." To format her text, the user may highlight 702 the text reciting "Things that are blue" to apply the appropriate header style. Since the user has performed this task before after typing a series of paragraphs, the predictive algorithm may know to suggest styles formatting during the first text selection when the selected text is from a preceding paragraph location after text in multiple paragraphs is entered.

As can be seen from FIG. 7A, when the user selects the text "Things that are blue:" (appearing as highlighted portion 702) using cursor 710, an identifiable predicted command region 712 appears, in this case as part of the mini toolbar, for the user to easily select a style.

The user may continue to perform a number of formatting steps to the entered text, such as creating a bulleted list from some of the paragraphs below the "Things that are blue:" heading. FIG. 7B picks up the process immediately after the sentence "Things appear blue that emit at a wavelength of 450-495 nm" has been cut. Here, the user is moving the text to a location above the list. In order to have the toolbar appear, the user may right click, using cursor 710, at the location where she wants to paste the sentence that was cut. The right-clicking action causes the toolbar to be displayed and the identifiable predicted command region 714 appears with the predicted "paste" command—based on the immediately preceding command of "cut" along with a predicted underlining command. This second command may have been predicted based on other times the user performed an underlining command after using the "cut" command.

Moving on to FIG. 7C, the user is now inserting pictures into her document for each item on the list. The identifiable region 716 now surfaces commands, for example, based on the context and her preceding commands.

It should be understood that the underlying prediction algorithm may be any suitable algorithm and that the example shown in FIGS. 7A-7C is merely intended to illustrate one example of how the predictive contextual toolbar feature can be used.

FIG. 9 shows a block diagram illustrating components of a computing device used in some embodiments. For example, system 900 can be used in implementing a user or client device in the form of a desktop or notebook computer or a tablet or a smart phone or the like that can run one or more applications. In some embodiments, system 900 is an integrated computing device, such as an integrated PDA and wireless phone. It should be understood that aspects of the system described herein are applicable to both mobile and traditional desktop computers, as well as server computers and other computer systems. For example, touchscreen or touch-enabled devices (included, but not limited to, touch-enabled track pad or mouse) may be applicable to both mobile and desktop devices.

System 900 includes a processor 905 that processes data according to instructions of one or more application programs 910, and/or operating system 920. The processor 905 may be, or is included in, a system-on-chip (SoC) along with one or more other components such as sensors (e.g., magnetometer, an ambient light sensor, a proximity sensor, an accelerometer, a gyroscope, a Global Positioning System sensor, temperature sensor, shock sensor) and network connectivity components (e.g., including Radio/network interface 935).

The one or more application programs 910 may be loaded into memory 915 and run on or in association with the operating system 920. Examples of application programs include phone dialer programs, e-mail programs, PIM programs, word processing programs, spreadsheet programs, Internet browser programs, messaging programs, game programs, and the like. Other applications may be loaded into memory 915 and run on the device, including various client and server applications.

It can be understood that the memory 915 may involve one or more memory components including integrated and removable memory components and that one or more of the memory components can store an operating system. According to various embodiments, the operating system includes, but is not limited to, SYMBIAN OS from Symbian Ltd., WINDOWS MOBILE OS from Microsoft Corporation, WINDOWS PHONE OS from Microsoft Corporation, WINDOWS from Microsoft Corporation, PALM WEBOS from Hewlett-Packard Company, BLACKBERRY OS from Research In Motion Limited, IOS from Apple Inc., and ANDROID OS from Google Inc. Other operating systems are contemplated.

System 900 also includes non-volatile storage 925 within memory 915. Non-volatile storage 925 may be used to store persistent information that should not be lost if system 900 is powered down. Application programs 910 may use and store information in non-volatile storage 925, such as a record of commands executed during the creation or modification of content in a productivity application and the like. A synchronization application may also be included and reside as part of the application programs 910 for interacting with a corresponding synchronization application on a host computer system (such as a server) to keep the information stored in non-volatile storage 925 synchronized with corresponding information stored at the host computer system.

System 900 has a power supply 930, which may be implemented as one or more batteries and/or an energy harvester (ambient-radiation, photovoltaic, piezoelectric, thermoelectric, electrostatic, and the like). Power supply 930 may further include an external power source, such as an AC adapter or a powered docking cradle that supplements or recharges the batteries.

System 900 may also include a radio/network interface 935 that performs the function of transmitting and receiving radio frequency communications. The radio/network interface 935 facilitates wireless connectivity between system 900 and the "outside world," via a communications carrier or service provider. Transmissions to and from the radio/network interface 935 are conducted under control of the operating system 920, which disseminates communications received by the radio/network interface 935 to application programs 910 and vice versa.

The radio/network interface 935 allows system 900 to communicate with other computing devices, including server computing devices and other client devices, over a network.

An audio interface 940 can be used to provide audible signals to and receive audible signals from the user. For example, the audio interface 940 can be coupled to speaker to provide audible output and a microphone to receive audible input, such as to facilitate a telephone conversation. System 900 may further include video interface 945 that enables an operation of an optional camera (not shown) to record still images, video stream, and the like.

Visual output can be provided via a touch screen display 955. In some cases, the display may not be touch screen and user input elements, such as buttons, keys, roller wheel, and the like are used to select items displayed as part of a graphical user interface on the display 955. A keypad 960 can also be included for user input. The keypad 960 may be a physical keypad or a soft keypad generated on the touch screen display 955. In some embodiments, the display and the keypad are combined. In some embodiments two or more input/output (I/O) components including the audio interface 940 and video interface 945 may be combined. Discrete processors may be included with the I/O components or processing functionality may be built-in to the processor 905.

The display 955 may present graphical user interface ("GUI") elements, a predictive contextual toolbar user interface, text, images, video, notifications, virtual buttons, virtual keyboards, messaging data, Internet content, device status, time, date, calendar data, preferences, map information, location information, and any other information that is capable of being presented in a visual form. In some embodiments, the display 955 is a liquid crystal display ("LCD") utilizing any active or passive matrix technology and any backlighting technology (if used). In some embodiments, the display 955 is an organic light emitting diode ("OLED") display. Of course, other display types are contemplated.

A touchscreen (which may be associated with the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

In other embodiments, a touch pad may be incorporated on a surface of the computing device that does not include the display. For example, the computing device may have a touchscreen incorporated on top of the display and a touch pad on a surface opposite the display.

In some embodiments, the touchscreen is a single-touch touchscreen. In other embodiments, the touchscreen is a multi-touch touchscreen. In some embodiments, the touchscreen is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen. As such, a developer may create gestures that are specific to a particular application program.

In some embodiments, the touchscreen supports a tap gesture in which a user taps the touchscreen once on an item presented on the display. The tap gesture may be used for various reasons including, but not limited to, opening or launching whatever the user taps. In some embodiments, the touchscreen supports a double tap gesture in which a user taps the touchscreen twice on an item presented on the display. The double tap gesture may be used for various reasons including, but not limited to, zooming in or zooming out in stages, and selecting a word of text. In some embodiments, the touchscreen supports a tap and hold gesture in which a user taps the touchscreen and maintains contact for at least a pre-defined time. The tap and hold gesture may be used for various reasons including, but not limited to, opening a context-specific menu.

In some embodiments, the touchscreen supports a pan gesture in which a user places a finger on the touchscreen and maintains contact with the touchscreen while moving the finger on the touchscreen. The pan gesture may be used for various reasons including, but not limited to, moving through screens, images, or menus at a controlled rate. Multiple finger pan gestures are also contemplated. In some embodiments, the touchscreen supports a flick gesture in which a user swipes a finger in the direction the user wants the screen to move. The flick gesture may be used for various reasons including, but not limited to, scrolling horizontally or vertically through menus or pages. In some embodiments, the touchscreen supports a pinch and stretch gesture in which a user makes a pinching motion with two fingers (e.g., thumb and forefinger) on the touchscreen or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes, a nose, chin, or objects such as styluses may be used to interact with the touchscreen. As such, the above gestures should be understood as being illustrative and should not be construed as being limiting in any way.

It should be understood that any mobile or desktop computing device implementing system 900 may have more or fewer features or functionality than described and is not limited to the configurations described herein.

In various implementations, data/information stored via the system 900 may include data caches stored locally on the device or the data may be stored on any number of storage media that may be accessed by the device via the radio/network interface 935 or via a wired connection between the device and a separate computing device associated with the device, for example, a server computer in a distributed computing network, such as the Internet. As should be appreciated such data/information may be accessed through the device via the radio interface 935 or a distributed computing network. Similarly, such data/information may be readily transferred between computing devices for storage and use according to well-known data/information transfer and storage means, including electronic mail and collaborative data/information sharing systems.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

In accordance with embodiments of the invention, computer-readable media can be any available computer-readable storage media or communication media that can be accessed by the computer system.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" should not be construed or interpreted to include any carrier waves or propagating signals.

In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A system comprising:
    a processor;
    a display;
    memory; and
    a productivity application stored on the memory that when executed by the processor direct the processor to provide, to the display, a graphical user interface comprising:
        a canvas; and
        an identifiable region, the identifiable region being one of a designated region of the canvas or a designated region of a tool bar, wherein:
            in response to detection of an active selection on a portion of content, dynamic predicted commands are surfaced on the identifiable region;
            in response to detection of a period of inactivity in relation to a portion of content for a predefined period of time, or detection of a series of interactions with a portion of the canvas that does not result in selection of a command, dynamic predicted commands are surface on the identifiable region; and
            in response to one of the active selection on the portion of content or the period of inactivity in relation to the portion of content, a context associated with the portion of content is determined while the user is interacting with the content, wherein the context includes an application type, an application state, a file, and a user history; and
            wherein the dynamic predicted commands are one or more commands that are identified as having a probability of being used next, before receiving an indication from a user for a particular command associated with the condition for surfacing the predictive command, that is above a certain threshold based on the context, wherein the dynamic predicted commands change based on the context, wherein the dynamic predicted commands include at least one command the user may not be aware of.

2. The system of claim 1, wherein the interaction comprises a selection of content, a right click, or a gesture.

3. The system of claim 1, wherein the context comprises a selected content.

4. The system of claim 3, wherein the context further comprises at least one preceding command.

5. The system of claim 1, wherein the dynamic predicted commands comprise formatting commands.

6. The system of claim 1, wherein the identifiable region is configured to surface 1-5 commands at a same time.

7. A method comprising:
    detecting an interaction with a portion of content displayed on a user interface by a user;
    determining a context associated with the portion of content while the user is interacting with the content, wherein the context includes an application type, an application state, a file, and a user history;
    in response to detecting an active selection on the portion of content displayed on the user interface, determining that conditions for surfacing a predictive command are met;
    in response to detecting a period of inactivity in relation to the portion of content for a predefined period of time or detecting a series of interactions with the portion of content that does not result in selection of a command, determining that conditions for surfacing the predictive command are met;
    identifying one or more predicted commands that have a probability of being used next, before receiving an indication from the user for a particular command associated with the conditions for surfacing the predictive command, that is above a certain threshold based on the context associated with the conditions for surfacing the predictive command, wherein the one or more predicted commands change based on the context, wherein the dynamic predicted commands include at least one command the user may not be aware of; and
    displaying an identifiable region on which the one or more predicted commands are surfaced, wherein displaying the identifiable region comprises displaying a mini toolbar having an extension region for surfacing the predicted commands.

8. The method of claim 7, further comprising:
    surfacing one or more predicted commands on the identifiable region; and
    dismissing a surfaced command in response to receiving a selection of the surfaced command.

9. The method of claim 7, wherein the conditions for surfacing the predictive command comprise a selection of content.

10. The method of claim 7, wherein the conditions for surfacing the predictive command comprise a right click or a gesture over content or repeated selection of a menu or tabs.

11. The method of claim 7, wherein the context associated with the conditions for surfacing the predictive command comprises information related to the selection of the content and at least one preceding command.

12. A computer readable storage medium having instructions stored thereon that, when executed by a processor, perform a method comprising:
  detecting an interaction with a portion of content by a user;
  determining a context associated with the portion of content while the user is interacting with the content, wherein the context includes an application type, an application state, a file, and a user history;
  in response to detecting an active selection on the portion of content displayed on the user interface, determining that conditions for surfacing a predictive command are met;
  in response to detecting a period of inactivity in relation to the portion of content for a predefined period of time or detecting a series of interactions with the portion of content that does not result in selection of a command, determining that conditions for surfacing the predictive command are met;
  displaying an identifiable region on which predicted commands are surfaced when the conditions for surfacing the predictive command are met, wherein displaying the identifiable region comprises displaying a mini toolbar having an extension region for surfacing the predicted commands;
  identifying one or more predicted commands that have a probability of being used next, before receiving an indication from a user for a particular command associated with the conditions for surfacing the predictive command, that is above a certain threshold based on the context associated with the conditions for surfacing the predictive command, wherein the one or more predicted commands change based on the context, wherein the dynamic predicted commands include at least one command the user may not be aware of;
  surfacing the one or more predicted commands on the identifiable region; and
  dismissing a surfaced command in response to receiving a selection of the surfaced command.

13. The medium of claim 12, further comprising dismissing the identifiable region when it is determined that a dismissal interaction with the canvas is received.

14. The medium of claim 12, wherein the conditions for surfacing the predictive command comprise a selection of content or a right click or gesture over content or repeated selection of a menu or tabs.

15. The medium of claim 12, wherein the context associated with the conditions for surfacing the predictive command comprises information related to the selection of the content and at least one preceding command.

16. The medium of claim 12, wherein displaying the identifiable region comprises displaying the identifiable region at a location in proximity to a cursor.

\* \* \* \* \*